May 24, 1955

F. G. PHINNEY ET AL 2,709,102

SLIDING DOOR HANDLE

Filed Sept. 26, 1952

Inventor
Frederick G. Phinney &
Everett B. Arnold Jr.
By Willits, Helwig & Baillio
Attorneys

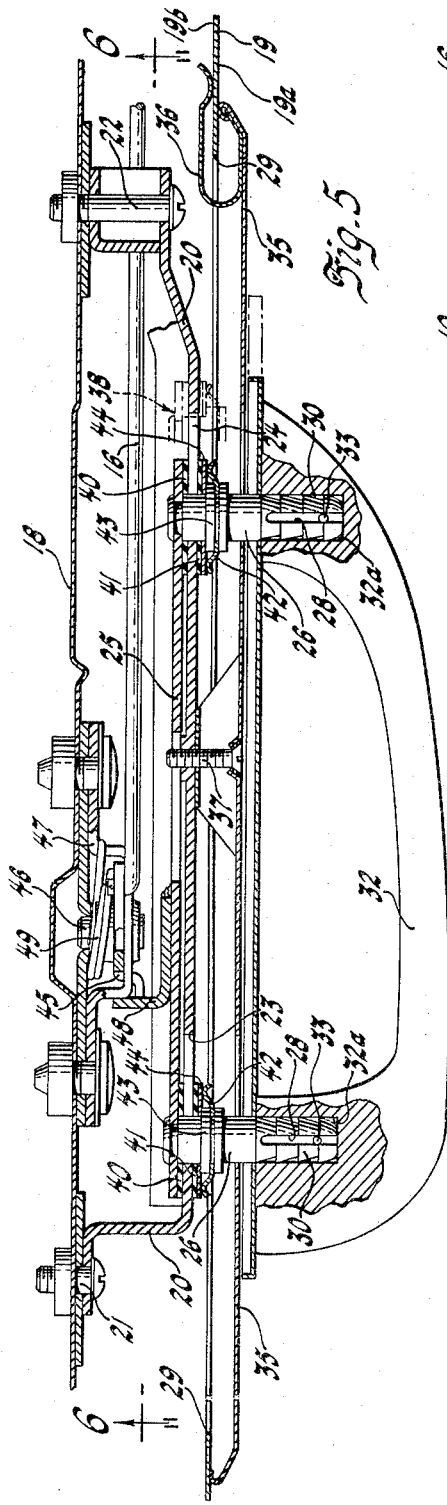

United States Patent Office 2,709,102
Patented May 24, 1955

2,709,102

SLIDING DOOR HANDLE

Frederick G. Phinney and Everett B. Arnold, Jr., Detroit, Mich., assignors to General Motors Corporation, Detroit, Mich., a corporation of Delaware Application September 26, 1952, Serial No. 311,722

13 Claims. (Cl. 292—336.3)

This invention relates to a sliding door handle, and more particularly to an inside sliding door handle providing remote control of latch means for a vehicle door.

Automobile doors are provided with outside handles adjacent the door latching means, and with inside handles which are usually located remote from the door latching means. In most modern automobiles each door is hinged at its forward side and is latched at its rear side, so that in the event the latch means inadvertently is released while the automobile is travelling at high speed, air resistance will tend to hold the door closed. Conventionally the inside remote handle is a pivoted turn handle, and it is possible for the handle inadvertently to be operated while the car is in motion if a passenger in the car is thrown against the handle, since the direction of the force required to operate the handle is not directly opposed to the direction of movement of the vehicle. In such event the door may be opened against the force of the air resistance, particularly if the vehicle is moving slowly.

The invention provides a slidable door handle inside the vehicle, the handle being arranged so that it must be moved rearwardly to open the door, i. e., the direction of the force required to operate the handle is directly opposed to the direction of normal movement of the vehicle. With this arrangement it is almost impossible for the door to be inadvertently opened in the event a passenger in the automobile is thrown against the handle, as may happen when the automobile swerves or when the brakes are suddenly applied.

The slidable handle is so designed that it may be used with conventional latch means and with conventional remote latch actuating means which connect the remotely located handle to the latch operating means. In addition, a one-way connection is provided between the handle and the remote actuating means so that movement of the handle in a direction rearwardly of the vehicle will release the latch, but the handle may be returned in a direction forwardly of the vehicle to its normal position independently of the position of the latch, and the handle need not be moved when the door is being closed. Since the handle does not pivot, it may readily be grasped and pulled inwardly of the vehicle to close the door, and, therefore, the separate pull-to handle, which is conventionally provided on the inner surface of the door, may be dispensed with.

Other features and advantages of the invention will be apparent from the following specification and from the drawings, in which:

Figure 5 is an enlarged section similar to a portion of Figure 2; and

Figure 6 is a section, partially broken away, taken along the line 6—6 of Figure 5, parts being shown in solid lines in one position and in broken lines in another position.

Figure 1:
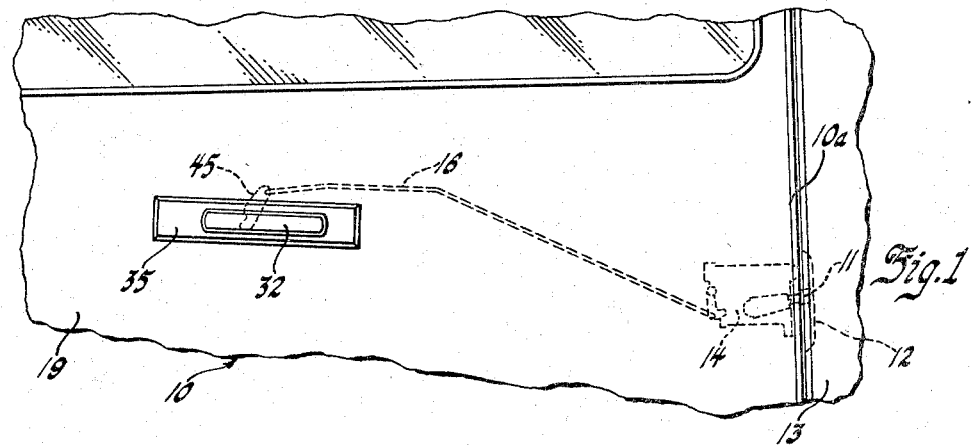
Figure 1 is a fragmentary side elevation of an automobile interior showing a portion of the rear door thereof and incorporating the slidable handle of the invention.

Referring now more particularly to the drawings, Figure 1 shows an automobile rear door, designated generally as 10, which is hingedly mounted along its forward side on the automobile body, and which is provided adjacent its rear side 10a with a latch bolt 11 adapted to engage a latch keeper 12 in a rear body pillar 13. While the slidable handle of the invention may be used with many different forms of latches, as for example, latches having retractable bolts or rotary bolts, the latch illustrated has a pivoted bolt 11 projecting from a latch operating means 14 mounted inside the door 10, this latch means being of a type in general commercial use. The details of the latch and the latch operating means are immaterial to the invention. This mechanism is in commercial use, and a complete disclosure thereof may be found in the copending application of James D. Leslie et al., entitled "Door Lock," filed November 28, 1947, as Serial No. 788,534, now Patent 2,641,495. An axially movable actuating rod 16 provides for operation of the latch by a remotely located handle 32 inside the door, the rear end of the actuating rod being connected to the latch operating means 14, and the rod 16 extending from the operating means 14 forwardly of the automobile to a point near the remote inside handle 32.

Figure 2:
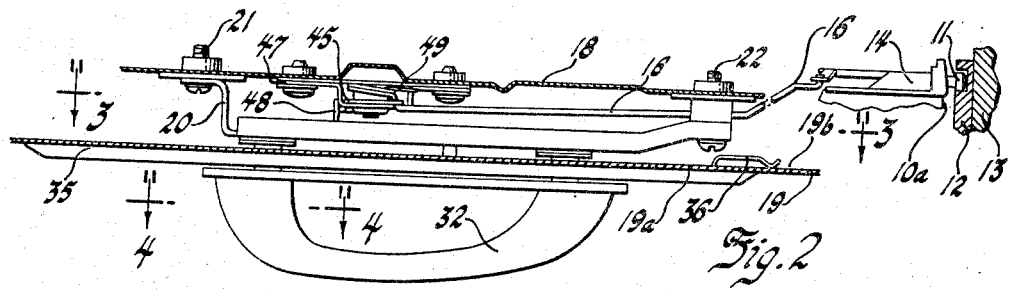
Figure 2 is an enlarged fragmentary longitudinal horizontal section through the door and door pillar.
Figure 3:
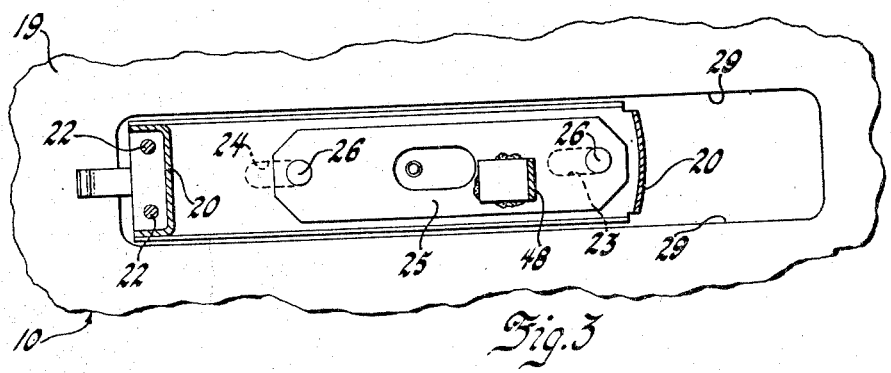
Figure 3 is a section taken along the line 3—3 of Figure 2.

As shown best in Figures 2 and 5, there is a main panel 18 inside the door, and an inside cover panel 19 is spaced inwardly from said main panel 18. As used in this description and claims, the words "inside," "inner," or the like, and "outside," "outer," or the like, have reference to the position of the parts as they appear in a vehicle. For example, the cover panel 19 is referred to as being an "inner" panel with respect to the panel 18 and the outside of the automobile, and the surface 19a of the panel 19 is referred to as its "inner" surface, while the surface 19b of the panel 19 is referred to as its "outer" surface.

Figure 4:
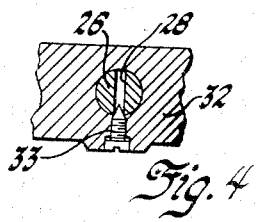
Figure 4 is a detail section through the handle member taken along the line 4—4 of Figure 2.

A mounting bracket 20, which is of generally U conformation, is carried by the main panel 18 in the space between the panels 18 and 19 at a point remote from the latch operating mechanism 14, the bracket 20 being mounted on the panel 18 by means of bolts 21 and 22. The bracket 20 is provided with spaced longitudinal slots 23 and 24, and a plate 25 is positioned adjacent the outside surface of the mounting bracket 20, said plate carrying studs 26, each of which projects through one of the slots 23 and 24 and each of which extends inwardly through a large rectangular opening 29 in the cover panel 19. The studs 26 are slotted longitudinally at their free ends as indicated by the reference character 28, and the free ends of the studs have serrations 30. The handle member 32 is provided with bores 32a adapted to receive the serrated ends of the studs 26, and the handle member is securely mounted on said studs by means of set screws 33 (Figures 4 and 5) having pointed ends which enter the slots 28 and wedge the serrations 30 into gripping engagement with the walls of the bores 32a in the handle member. The large opening 29 in the panel 19 permits ready assembly of the mounting bracket 20, plate 25, and the associated mechanisms described below, and after assembly of the parts this opening is covered by an escutcheon plate 35 which is secured to the panel 19 by a clip 36 at one end of the opening 29 and by a bolt 37 which engages the bracket 20 at the side of the opening 29.

The above described mounting of the handle member 32 permits forward and rearward sliding movement of said handle and plate 25, the slots 23 and 24 in the bracket 20 providing guides and stop means to limit this movement. In Figure 5 the handle 32 is shown in solid lines in its most forward position, which is its normal position. The handle 32 and plate 25 are manually slidable in a direction rearwardly of the automobile, as indicated by the fragmentary showing in Figure 5 designated generally as 38. In order to provide easy sliding movement, a nylon bearing washer 40 is mounted on each stud 26 between the plate 25 and the bracket 20, and a similar nylon bearing washer 41 is mounted on each stud between the bracket 20 and a spring washer 42 which is carried in a collar 43 on the shank of each stud on the inner side of the mounting bracket 20. The collar 43 may be integral with the stud 26, and the head of the stud may be staked over so that the stud firmly engages the plate 25. A pressure washer 44 is positioned between each spring washer 42 and the nylon bearing washer 41.

A link 45 is pivotally mounted on a stud 46 which is carried in a bracket 47 bolted to the inner surface of the main panel 18. As shown best in Figure 6, the link is pivoted intermediate its ends, one end being connected to the forward end of the actuating rod 16 and the other end being adapted to abut an ear 48 which projects outwardly from the plate 25. A spring 49 is operable upon the link to bias it in a clockwise direction (as the parts appear in Figure 6) so that the free end of the link normally abuts the ear 48 when the handle 32 is in its normal or forward position.

When it is desired to open the automobile door, the handle 32 is manually moved in a direction rearwardly of the automobile (to the right as the parts appear in Figures 5 and 6), the limit of such movement being defined by the length of the slots 23 and 24 in the bracket 20. This movement of the handle pivots the link from the solid line position in Figure 6 to the broken line position in said figure, causing axial movement of the rod 16. Since the rear end of the rod 16 is secured to the latch bolt operating means 14, the bolt is retracted and the door may be opened. The handle 32 may be returned to its normal position either manually or by the force of the spring 49, and when the door is closed the latch bolt may operate and the rod 16 may be moved axially without disturbing the position of the handle 32, since the one-way connection between the handle 32 and the link 45 provides for independent movement between the link 45 and said handle. Similarly, it should be noted that the sliding movement of the handle 32 in a direction forwardly of the vehicle is independent of the rod 16 because of the one-way connection.

While we have shown and described one embodiment of our invention, it is capable of many modifications. Changes therefore, in the construction and arrangement may be made without departing from the spirit and scope of the invention as set forth in the appended claims.

We claim:

1. In a latch for a door having a latch bolt and operating means for the bolt, remote control apparatus of the character described, including: an actuating rod having one end connected to the operating means and the other end extending to a point remote from said operating means; a slidable gripping handle mounted on the door adjacent said other end of the rod, said handle having a hand-grip portion projecting from the surface of the door and slidable thereon; and means providing a one-way connection between said handle and rod, sliding movement of said handle in one direction causing movement of said rod, but sliding movement of said handle in the other direction being independent of said rod.

2. Apparatus of the character claimed in claim 1, wherein said slidable hand-grip portion is formed with a hand receiving recess.

3. In a latch for a door having a latch bolt and operating means for the bolt, remote control apparatus of the character described, including: an axially movable actuating rod having one end connected to the operating means and the other end extending to a point remote from said operating means; a slidable gripping handle mounted on the door adjacent said other end of the rod, said handle having a hand-grip portion projecting from the surface of the door and slidable thereon; means providing a one-way connection between said handle and rod, sliding movement of said handle in one direction causing movement of said rod, but sliding movement of said handle in the other direction being independent of said rod; and spring means for urging said rod into position to be moved upon movement of said handle.

4. In a latch for a door having a latch bolt, operating means for the bolt and an actuating rod having one end connected to said operating means and the other end extending to a point remote from said operating means, remote control apparatus of the character described, including: a slidable gripping handle mounted on the door adjacent said other end of the rod, said handle having a hand-grip portion projecting inwardly from the inner surface of the door and slidable thereon; a pivotally mounted link having one end connected to said other end of the rod; and means providing a one-way connection between said handle and link, sliding movement of said handle in one direction causing movement of said rod, but sliding movement of said handle in the other direction being independent of said rod.

5. In a latch for a door having a latch bolt and operating means for the bolt, remote control apparatus of the character described, including: an axially movable actuating rod having one end connected to the operating means and the other end extending to a point remote from the said operating means; a slidable gripping handle mounted on the door adjacent said other end of the rod, said handle having a hand-grip portion with a hand receiving recess projecting inwardly from the inner surface of the door and slidable thereon; a link pivotally mounted intermediate its ends and having one end connected to said other end of the rod; and means providing a one-way connection between said handle and the other end of said link, sliding movement of said handle in one direction pivoting said link to cause axial movement of said rod, but sliding movement of said handle in the other direction being independent of said rod.

6. In a latch for a vehicle door having a panel with inside and outside surface portions and having a latch bolt carried by the door adjacent the rear side thereof, and means mounted outside the panel for operating the bolt, remote control apparatus of the character described, including: an axially movable actuating rod outside the panel, said rod having one end connected to the operating means and the other end extending forwardly of the vehicle to a point remote from said operating means; a slidable gripping handle mounted on the door adjacent said other end of the rod, said handle having a hand-grip portion with a hand receiving recess projecting inwardly from the inner surface of the door and slidable thereon; means connected to said handle and extending through said panel to a position opposite said handle adjacent the outer surface of said panel; a pivotally mounted link outside said panel, said link having one end connected to said other end of the rod; and means providing a one-way connection between the means extending through said panel and said link, sliding movement of said handle in a direction rearwardly of said vehicle pivoting said link to cause axial movement of said rod, but sliding movement of said handle in a direction forwardly of said vehicle being independent of said rod.

7. In a latch for a vehicle door having a panel with inside and outside surface portions and having a latch bolt carried by the door, means outside said panel for operating the bolt, and an axially movable actuating rod outside the panel having one end connected to said operating means and the other end extending remote from said operating means, remote control apparatus of the character described, including: a slidable gripping handle mounted on the door adjacent said other end of the rod, said handle having a hand-grip portion projecting inwardly from the inner surface of the door and slidable thereon; means connected to said handle and extending through said panel to a position opposite said handle adjacent the outer surface of said panel; a pivotally mounted link outside said panel, said link having one end connected to said other end of the rod; means providing a one-way connection between the means extending through said panel and said link, sliding movement of said handle in one direction pivoting said link to cause axial movement of said rod, but sliding movement of said handle in the other direction being independent of said rod; and spring means for urging said rod and link into position to be moved upon movement of said handle.

8. In a latch for a vehicle door having a panel with inside and outside surface portions and having a latch bolt carried by the door, means outside said panel for operating the bolt, and an axially movable actuating rod outside the panel having one end connected to said operating means and the other end extending remote from said operating means, remote control apparatus of the character described, including: a slidable gripping handle mounted on the door adjacent said other end of the rod, said handle having a hand-grip portion with a hand receiving recess projecting inwardly from the inner surface of the door and slidable thereon; a plate adjacent the outer surface of said panel opposite said handle; means extending through said panel interconnecting said plate and handle; a pivotally mounted link outside said panel, said link having one end connected to said other end of the rod; and means providing a one-way connection between said plate and said link, sliding movement of said handle and plate in one direction pivoting said link to cause axial movement of said rod, but sliding movement of said handle and plate in the other direction being independent of said rod.

9. In a latch for a vehicle door having a panel with inside and outside surface portions and having a latch bolt carried by the door adjacent the rear side thereof, and means mounted outside the panel for operating the bolt, remote control apparatus of the character described, including: an axially movable actuating rod outside the panel, said rod having one end connected to the operating means and the other end extending forwardly of the vehicle to a point remote from said operating means; a slidable gripping handle mounted on the door adjacent said other end of the rod, said handle having a hand-grip portion projecting inwardly from the inner surface of the door and slidable thereon; a plate adjacent the outer surface of said panel opposite said handle; means extending through said panel interconnecting said plate and handle; a link pivotally mounted between its ends outside said panel, said link having one end connected to said other end of the rod; and an ear projecting from said plate and adapted to engage the other end of said link, sliding movement of said handle and plate in a direction rearwardly of said vehicle pivoting said link to cause axial movement of said rod, but sliding movement of said handle and plate in a direction forwardly of said vehicle being independent of said rod.

10. In a latch for a vehicle door having a panel with inside and outside surface portions and having a latch bolt carried by the door, means outside said panel for operating the bolt, and an axially movable actuating rod outside the panel having one end connected to said operating means and the other end extending remote from said operating means, remote control apparatus of the character described, including: a slidable gripping handle mounted on the door adjacent said other end of the rod, said handle having a hand-grip portion with a hand receiving recess projecting inwardly from the inner surface of the door and slidable thereon; a plate adjacent the outer surface of said panel opposite said handle; means extending through said panel interconnecting said plate and handle; a link pivotally mounted between its ends outside said panel, said link having one end connected to said other end of the rod; an ear projecting from said plate and adapted to engage the other end of said link, sliding movement of said handle and plate toward said link pivoting said link to cause axial movement of said rod, but sliding movement of said handle and plate away from said link being independent of said rod, and spring means operative upon said link for urging said link and rod into position to be moved upon movement of said handle.

11. In a latch for a vehicle door having a panel with inside and outside surface portions and having a latch bolt carried by the door, means outside said panel for operating the bolt, and an axially movable actuating rod outside the panel having one end connected to said operating means and the other end extending remote from said operating means, remote control apparatus of the character described, including: a gripping handle slidably mounted adjacent the inner surface of the panel near said other end of the rod; a plate adjacent the outer surface of said panel opposite said handle; studs extending through openings in said panel and interconnecting said plate and handle; bearing means on said studs engaging a portion of said door to provide a slidable mounting for said handle and plate; a pivotally mounted link outside said panel, one end of said link being connected to said other end of the rod and the other end of the link being adjacent said handle; and means connected to said handle and adapted to engage said other end of the link, sliding movement of the handle in one direction pivoting said link to cause axial movement of the rod, but sliding movement of said handle in the other direction being independent of the rod.

12. In a latch for a vehicle door having a main panel inside the door and an inside cover panel spaced from said main panel and having a latch bolt carried by the door adjacent the rear side thereof, means mounted inside the door for operating the bolt and an axially movable rod having one end connected to said operating means and the other end extending forwardly of the vehicle to a point between said panels remote from said operating means, remote control apparatus of the character described, including: a mounting bracket carried by the main panel in the space between the panels, said bracket having spaced elongated openings therein; a handle slidably mounted adjacent the inner surface of said cover panel opposite an opening therein; a plate on the opposite side of said cover panel adjacent said mounting bracket; studs extending through the opening in said cover panel and the elongated openings in said bracket and interconnecting said handle and plate; bearing means on said studs engaging said bracket adjacent said elongated openings to provide a slidable mounting for said handle and plate; a link pivotally mounted between its ends in the space between said panels, said link having one end connected to said other end of the rod; and an ear projecting from said plate and adapted to engage the other end of said link, sliding movement of said handle in a direction rearwardly of said vehicle causing movement of said rod, but sliding movement of said handle in a direction forwardly of said vehicle being independent of said rod.

13. In a latch for a vehicle door having a main panel inside the door and an inside cover panel spaced from the main panel and having a latch bolt carried by the door and means mounted inside the door for operating the bolt, remote control apparatus of the character described, including: an axially movable actuating rod having one end connected to the operating means and the other end extending to a point between the panels remote from said operating means; a mounting bracket carried by the main panel in the space between said panels, said bracket having spaced elongated openings therein; a handle slidably mounted adjacent the inner surface of said cover panel opposite an opening therein; a plate on the opposite side of said cover panel adjacent said mounting bracket; studs extending through the opening in said cover panel and the elongated openings in said bracket and interconnecting said handle and plate; bearing means on said studs engaging said bracket adjacent said elongated openings to provide a slidable mounting for said handle and plate; a link pivotally mounted between its ends in the space between said panels, said link having one end connected to said other end of the rod; and an ear projecting from said plate and adapted to engage the other end of said link, sliding movement of said handle toward said link causing movement of said rod, but sliding movement of said handle away from said link being independent of said rod; spring means operative upon said link for urging said rod into position to be moved upon movement of said handle; and an escutcheon plate mounted on the outer surface of said cover panel and concealing said opening therein.

References Cited in the file of this patent

UNITED STATES PATENTS

| | | |
|---|---|---|
| 2,162,749 | Ruska | June 20, 1939 |
| 2,231,075 | Lakin | Feb. 11, 1941 |